United States Patent [19]

Matsuda et al.

[11] 4,298,258
[45] Nov. 3, 1981

[54] DISTANCE MEASURING DEVICE

[75] Inventors: Motonobu Matsuda, Kawachinagano; Tohru Matsui; Yoshihiro Tanaka, both of Osaka, all of Japan

[73] Assignee: Minolta Camera Kabushiki Kaisha, Osaka, Japan

[21] Appl. No.: 68,969

[22] Filed: Aug. 23, 1979

[30] Foreign Application Priority Data

Aug. 28, 1978 [JP] Japan .................................. 53-104556

[51] Int. Cl.³ ........................ G03B 3/10; G03B 7/099
[52] U.S. Cl. ....................................... 354/25; 354/31
[58] Field of Search ................... 354/25, 31; 352/140; 355/56

[56] References Cited

U.S. PATENT DOCUMENTS

3,442,193  5/1969  Pagel ...................... 354/25
3,999,192  12/1976 Hosoe et al. ............ 354/25

Primary Examiner—Michael L. Gellner
Attorney, Agent, or Firm—Wenderoth, Lind & Ponack

[57] ABSTRACT

A distance measuring device is disclosed which includes a light emitting diode for projecting a light beam and photoresponsive elements for receiving the reflected light beam from an object. The photoresponsive elements are coupled to a circuit for producing a signal indicative of the distance between the device and the object. A circuit is provided for generating a timing signal in relation to the phase of the alternative fluctuations in the intensity of the ambient light. The light emitting diode is so controlled as to be allowed to project light beam when the timing signal is produced. The timing signal is arranged to occur during periods of zero or minimal ambient light fluctuations so that the distance measuring device is immune to the ambient light fluctuations.

16 Claims, 7 Drawing Figures

DISTANCE MEASURING DEVICE

BACKGROUND OF THE INVENTION

The present invention relates to a distance measuring device for use in a camera employing an automatic focusing system and, more particularly, to an improvement in the distance measuring device employing the principle of triangulation using a light beam.

Figure 1:
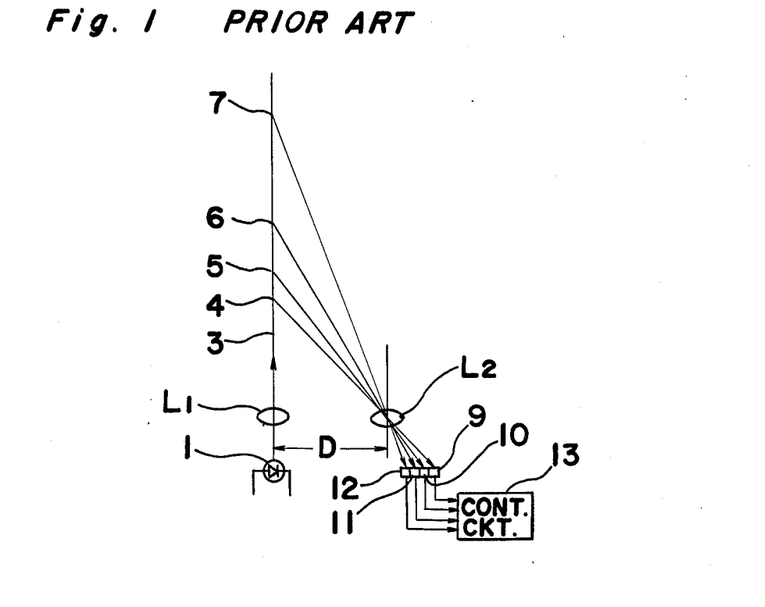
FIGS. 1 and 2 have already been referred to in the foregoing description, FIG. 1 being a schematical diagram showing a principle of distance measuring, and FIG. 2 being a graph showing waveforms of the fluctuating light obtained from the artificial light source and reflected light beam.

It is known in the art to use a light beam for measuring distance by triangulation. One example is schematically shown in FIG. 1 of the attached drawing and includes first and second stationary lens L1 and L2 positioned side-by-side and spaced a predetermined distance D from each other. Positioned behind the first lens L1 is a light source 1 for emitting a beam of light through the first lens L1 towards an object. A plurality, of, for example, four as shown, photoresponsive sensing elements 9, 10, 11 and 12 are arranged in a row behind the second stationary lens L2. A pulsed light beam 3 emitted from the light source 1 and passing through the lens L1 is directed to an object relative to which the distance from the device is to be measured. The light beam reflected from the object which may be located at any point along the path of travel of light beam 3 will, after having passed through the second stationary lens L2, impinge on and be properly focused on one of the photoresponsive elements 9, 10, 11 and 12. If the object is located at the position 4, the light beam reflected from the object will fall and be properly focused on the photoresponsive element 9. Accordingly, a pulse signal is produced from the photoresponsive element 9 indicating that the object is located at the position 4. This pulse signal is applied to a control circuit 13 which may be so operated upon receipt of the pulse signal from the element 9 as to control an optical arrangement, coupled thereto, to be brought in a focused condition with the object located at the position 4.

Similarly, the photoresponsive elements 10, 11 and 12 produce a pulse signal when the object is located at positions 5, 6 and 7, respectively.

Figure 2:
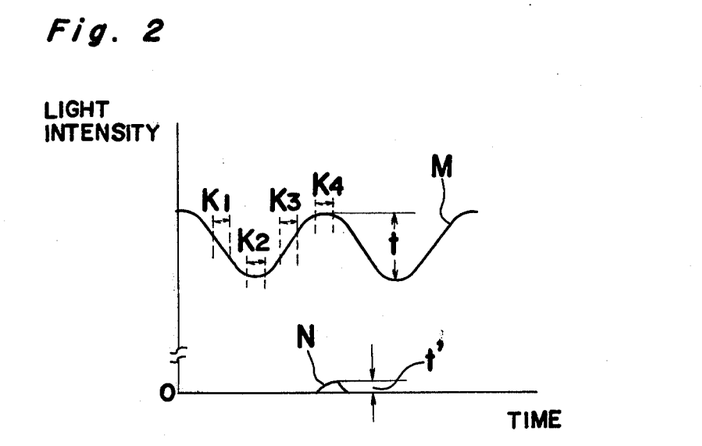

In addition to the reflected light beam, each of the photoresponsive elements 9 to 12 tends to receive ambient light such as that emitted by incandescent and/or fluorescent lamps operating on alternating current, which often adversely affect the performance of each photoresponsive sensing element and, hence, the characteristics of a pulse signal. Generally, the lamp, for example, a fluorescent lamp or an incandescent lamp is lit by the supply of a commercial AC power source having a frequency of 60 Hz. Thus, although the human eyes are not able to perceive it, the light intensity from the lamp fluctuates at the frequency of a 120 Hz in a form of sinusoidal wave. FIG. 2 of the attached drawing shows a graph of light intensity in which the curve M represents the light intensity of ambient light, while the curve N represents the light intensity of received light beam. The total light intensity received by the photoresponsive element can be considered as a sum of the intensities represented by the curves M and N.

The intensity $t'$ of the received light beam N varies with the distance between the light source 1 and the object and/or the reflection factor of the object, and the degree of fluctuation t varies with the brightness of the lamp. Therefore, there may be a case where the intensity $t'$ of the received light beam N becomes smaller than the fluctuation t of the light from the lamp. Furthermore, the region or location on which the light beam N is added over the ambient light M depends on the moment when the light beam is radiated. For example, the light beam N can be radiated in a region K1, K2, K3 or K4 shown in FIG. 2. Since the signal obtained from each of the sensing elements is in relation to the light intensity, each of the photoresponsive elements produces a similar sinusoidal wave with a pulse signal corresponding to the curve N being impressed over the fluctuating signal. The detection of such pulse signal indicative of received light beam is normally carried out by the use of a comparator which compares the received signal from the photoresponsive element with a predetermined threshold level and produces a signal when the received signal exceeds the threshold level. Since the signal corresponding to the ambient light may fluctuate, it is quite difficult to distinguish the pulse signal particularly when the amplitude of the pulse signal is very small.

Although this difficulty can be removed by modulating the light beam into a particular frequency distinguishable from the frequency of the commercial AC power source, such modulation requires a considerably increased manufacturing cost because of the employment of the frequency modulator and also requires higher electric power for the operation.

Another method for removing the difficulty is to use light beam having a particular color and optical filter for filtering only the light beam. This method, however, has a disadvantage in that the selected particular color for the beam light may be interfered with by the same color light contained in the ambient light.

SUMMARY OF THE INVENTION

Accordingly, it is a primary object of the present invention to provide a distance measuring device which detects the presence of the pulse signal corresponding to the reflected light beam regardless of the presence of the fluctuations in the ambient light.

It is another object of the present invention to provide a distance measuring device of the above described type which is simple in construction and can be readily manufactured at a low cost.

In accordance with a preferred embodiment of the invention, a distance measuring device comprises light beam projecting means, and means for receiving the light beam reflected from an object to be measured. The light beam receiving means is for obtaining information of the zonal distance between the distance measuring device and the object by detecting the arrival of the reflected beam light from the object. The distance measuring device further comprises means responsive to an ambient light for producing a signal following the change in brightness of the ambient light and means connected to the ambient light responsive means for generating a timing signal in relation to the phase of the alternative changes in the intensity of the ambient light. This generating means is connected to the light beam projecting means for permitting the projecting means to project the light beam when the timing signal is received.

BRIEF DESCRIPTION OF THE DRAWINGS

The foregoing and other objects, features and advantages of the invention will be apparent from the following description of the invention with reference to the accompanying drawings in which.

DETAILED DESCRIPTION OF THE INVENTION

Before the description of the present invention proceeds, it is to be noted that like parts are designated by like reference numerals throughout the accompanying drawings.

Figure 3:
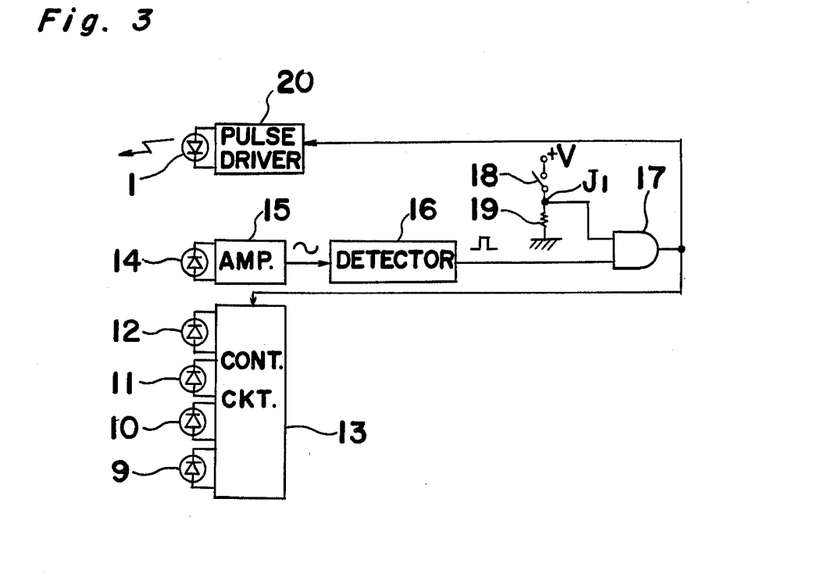
FIG. 3 is a block diagram of a distance measuring device according to the present invention.

Referring to FIG. 3, a distance measuring device according to the present invention comprises a light beam producing means having a projecting lens (not shown) and a light emitting diode 1 located behind the projecting lens, a pulse driver 20 for generating a pulse for the light emitting diode 1, and photoresponsive sensing elements 9, 10, 11 and 12, each producing a pulse signal indicative of the zonal distance to the object. The photoresponsive elements 9 to 12 are coupled to a control circuit 13 which processes the obtained signals to actuate desired devices such as a zonal distance displaying device and/or a lens moving device. A photoresponsive sensing element 14 and an amplifier 15 constitutes a converter circuit for converting light received by the sensing element 14 into an electrical signal. Therefore, the amplifier 15 produces, when the ambient light contains lamp light, a fluctuating signal such as that shown by the curve M in FIG. 2. A detecting circuit 16 is connected to the amplifier 15 for detecting a specific phase of the signal from the amplifier or a moment when the rate of variation of the fluctuating signal received from the amplifier 15 is relatively low, that is when the inclination of the curve M is very gentle or zero. Such phase of signal or such moment would be detected in the regions K2 and K4 shown in FIG. 2. The detector 16 generates a pulse having a duration determined by the curve M when the zero or low variation rate is detected. The output of the detecting circuit 16 is connected to one input of an AND element 17. The other input of the AND element 17 is connected to the junction J1 between a switch 18 and a grounded resister 19. Since the switch 18 is connected to a source of electric power, the closure of the switch 18 provides a predetermined voltage to the junction J1. The output of the AND element 17 is connected to the pulse generator 20 and also to the control circuit 13.

The operation of the distance measuring device shown in FIG. 2 will now be described.

Upon the turning on of the switch 18, a high level signal is applied to one input of the AND element 17. As the distance measuring device is aimed at the object to be measured, the photoresponsive element 14 receives light reflected from the object and other ambient light and generates an electrical signal indicative of the received light which is then amplified in the amplifier 15.

When the ambient light contains lamp light, the signal produced from the amplifier 15 will fluctuate in the manner described above. Like the photoresponsive element 14, each of the photoresponsive elements 9 to 12 produce a similar electric signal therefrom to the control circuit 13. However, since the control circuit 13 is not actuated, the electric signals from the elements 9 to 12 are not processed. Upon detection of the moment when the variation rate of the fluctuating signal is about zero, the detector 16 produces a timing pulse signal which is applied through the AND element 17 to the pulse generator 20 and also to the control circuit 13. Upon receipt of the timing pulse signal from the AND element 17, the pulse generator 20 produces a pulse signal having a sufficient power to cause a light beam to be radiated from the light emitting diode 1. The radiated light beam reflects on the object and then fall on one of the photoresponsive elements 9 to 12 according to the distance between the distance measuring device and the object. Since the control circuit 13 is placed in the operative state by the timing pulse signal from the AND element 17, the signal received from the photoresponsive elements 9 to 12 are processed for actuating various devices such as display device (not shown) for the display of the distance or lens moving device (not shown) for automatically moving the lens asembly (not shown) to a focused position with respect to the object. Since such devices are actuated in a known method, the further description thereof is omitted for the sake of brevity. Here, it should be noted that the wave length band of the light emitted from the light emitting diode or sensed by the photoresponsive elements is of the non-visible band such as the infrared band.

Figure 4:
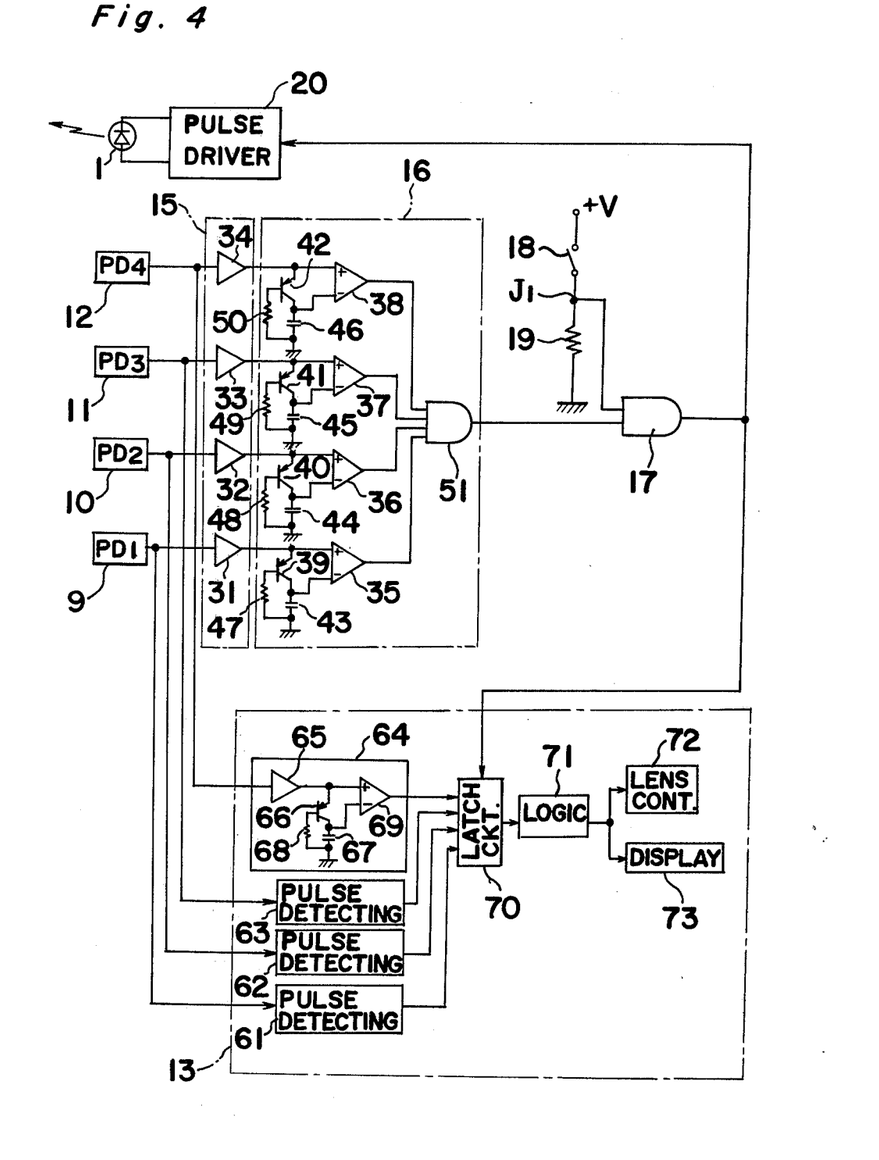
FIG. 4 is a circuit diagram showing one embodiment of the distance measuring device.

Referring to FIG. 4, one embodiment of the distance measuring device according to the present invention is shown. In this embodiment, the detector 16 is so arranged as to detect the peak point of the fluctuating signal while the photoresponsive elements 9 to 12 are provided for detecting the reflected light beam for the control circuit 13 and also for detecting the ambient light for the detector 16.

The photoresponsive elements 9 to 12 are connected to amplifiers 31, 32, 33 and 34, respectively, and in turn to non-inverting inputs of respective comparators 35, 36, 37 and 38. The outputs of the amplifiers 31, 32, 33 and 34 are also connected to the emitters of transistors 39, 40, 41 and 42, respectively. The bases of the transistors 39, 40, 41 and 42 are connected to the ground through resistors 47, 48, 49 and 50, respectively, while the collectors thereof are respectively connected through capacitors 43, 44, 45 and 46 to ground. The collectors of the transistors 39, 40, 41 and 42 are also connected to inverting inputs of the comparators 35, 36, 37 and 38, respectively. The outputs of the comparators 35, 36, 37 and 38 are connected to inputs of an AND element 51. The output of the AND element 51 is connected to one input of the AND element 17 described above. The operation of the detector 16 will now be explained.

Figure 5:
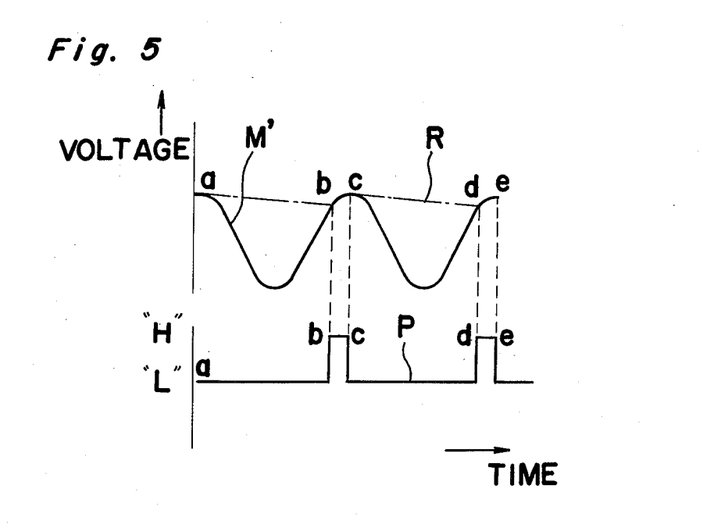
FIG. 5 is a graph showing waveforms of signals obtained at major points in the circuit of FIG. 4.

When the photoresponsive sensing element 9 receives ambient light, such as one shown by the curve M, it generates a signal indicative of the ambient light. The generated signal is amplified in the amplifier 31, and the amplified signal as shown by the curve M' of FIG. 5 is applied to the emitter of the transistor 39 and also to the non-inverting input of the comparator 35. A network constituted by the transistor 39, capacitor 43 and resistor 47 operates so as to rectify the fluctuating signal M'.

Therefore, the voltage produced across the capacitor 43 would be a rectified signal as shown by the curve R in FIG. 5 in which, during the regions b-c and d-e, the curves M' and R overlap each other. More particularly, the capacitor 43 is charged with the same voltage as the peak voltage of the fluctuating signal M' at the moments a, c and e shown in FIG. 5. Thereafter, that is, in a region a-b or c-d, the capacitor 43 is gradually discharged as shown by the line R. The fluctuating signal M' and the charged signal R across the capacitor 43 are compared with each other in the comparator 35. It is to be noted that the comparator 35 is provided with a predetermined off-set voltage so that the comparator 35 produces a low level signal when the signal applied to the non-inverting input is lower than the signal applied to the inverting input, that is, when the fluctuating signal M' is smaller than the charged signal R, and produces a high level signal when the signal applied to the non-inverting input is equal to or higher than the signal applied to the inverting input, that is, when the fluctuating signal M' is equal to or larger than the charged signal R. The waveform P illustrated in FIG. 5 shows the output signal from the comparator 35. Any one of the other comparators 36, 37 and 38 produces the same signal as the waveform P since the circuit coupled thereto has the same character and feature as the circuit described above while the signal applied to each circuit through the respective amplifier 32, 33 or 34 is very much like each other. Therefore, the moment when each of the comparators 36, 37 and 38 produces a high level signal coincides with the moment when the comparator 35 produces the high level signal. Therefore, the output signal from the AND element 51 has a waveform similar to the waveform P.

When the signals from the amplifiers 31 to 34 are constant, that is, when the ambient light contains no fluctuating light, the signals applied to the non-inverting input and inverting input of each comparator are the same, so that the comparator continuously produces a high level signal. Therefore, the AND element 51 also produces the high level signal.

Still referring to FIG. 4, the control circuit 13 includes pulse detecting circuits 61, 62, 63 and 64 which are connected to the photoresponsive elements 9, 10, 11 and 12, respectively. The details of each pulse detecting circuit is shown in the block 64 which includes an amplifier 65 having input connected to the photoresponsive element. The output of the amplifier 65 is connected to a non-inverting input of a comparator 69 and also to the emitter of a transistor 66. The base of the transistor 66 is connected to ground through a resistor 68 and the collector of the same is connected through a capacitor 67 to the ground. The collector of transistor 66 is also connected to an inverting input of the comparator 69. It is to be noted that the circuit constituted by the transistor 66, capacitor 67, resistor 68 and comparator 69 has the same wiring as the circuit contained in the detector 16 such as one including transistor 39, capacitor 43, resistor 47 and comparator 35. However, the off-set voltage provided in the comparator 69 is higher than that of the comparators employed in the detecting circuit 16 so that the comparator 69 produces a high level signal when the signal applied to the non-inverting input is higher than the voltage sum of the off-set voltage and the signal applied to the inverting input. Therefore, if the input signal to the pulse detecting circuit 64 has a waveform M' as shown in FIG. 5, the comparator 69 will not produce any high level signal even in the regions b-c and d-e.

Assuming that the light beam is projected to the object in the region b-c and the reflected light beam falls on the photoresponsive element 12, the photoresponsive element 12 produces a pulse in the region b-c carried on the fluctuating signal. Since the step-up or rising of the pulse is much more abrupt than the fluctuating signal, and since the time constant of the capacitor is chosen to be much longer than the step-up time of the pulse signal, the capacitor can not follow the voltage change of the pulse signal but merely follows the fluctuation signal. Therefore, the abrupt change of the pulse signal is directly transmitted to the non-inverting input of the comparator 69 while the gradual increase of the voltage across the capacitor 67 is transmitted to the inverting input of the comparator 69. Therefore, the voltage applied to the non-inverting input becomes larger than the sum of the fluctuating signal and the off-set voltage and, as a consequence, the pulse detector 64 produces a high level signal. This high level signal is used for identifying the distance to the object. A similar operation is carried out in any one of the pulse detecting circuits 61, 62 and 63.

Since the pulse detecting circuits 61 to 64 generate a high level signal for a very short period of time, the high level signal, as well as a low level signal, from the detecting circuits are stored in a latch circuit 70. The signal from the latch circuit 70 is applied to a logic circuit 71 in which the distance to the object is discriminated. When four pulse detecting circuits are employed such as in the foregoing embodiment, the logic circuit 71 produces 8 different distance signals: 4 distance signals are obtained when the reflected light beam falls on one of the four different photoresponsive elements; 3 distance signals are obtained when the reflected light beam falls on the neighboring two photoresponsive elements; and 1 distance signal is obtained when the reflected light beam falls on none of the photoresponsive elements. The signal obtained from the logic circuit 70 is applied to a lens control circuit 72 for controlling the degree of projection of objective lens (not shown) to bring the latter in a focused condition with the measured object, and also to a display circuit 73 for displaying the measured distance.

In the above described embodiment, the AND element 17 produces a timing pulse signal when the fluctuating signal reaches about its peak point, that is, in the region K4 shown in FIG. 2. This timing pulse signal actuates the producing means 1 to produce light beam and, at the same time, actuates the latch circuit 70 to take in the signals from the pulse detecting circuits 61, 62, 63 and 64. Therefore, the erroneous distance signal produced from any one of the circuits 61 to 64 during the period other than the period K4 will not be stored in the latch circuit 70.

Figure 6:
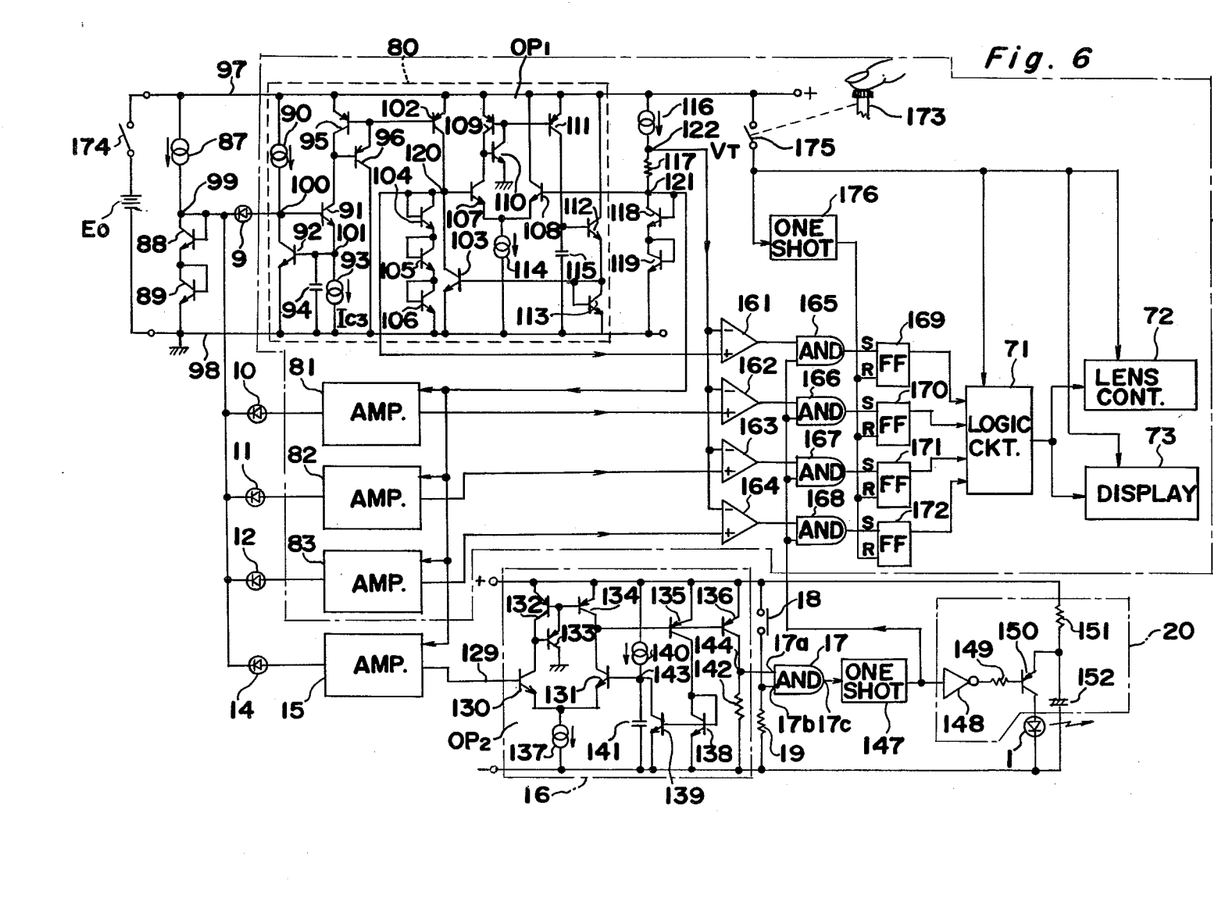
FIG. 6 is a circuit diagram showing another embodiment of the distance measuring device.

Referring to FIG. 6, another embodiment of the distance measuring device is shown. This embodiment is so arranged as to produce the control pulse signal at the moment when the fluctuating signal reaches about its minimum or valley point, that is, in the region K2 shown in FIG. 2. The control circuit 13 includes amplifiers 80, 81, 82 and 83 of identical construction, the details of which are shown in the block 80 enclosed by a chain line.

Each of the amplifiers is supplied with a predetermined voltage from a source of electric power which includes a constant current generator 87 and transistors 88 and 89 which are connected in series between lead wires 97 and 98. The source of electric power further includes a battery Eo and a switch 174 which are also connected in series between the lead wires 97 and 98. When the switch 174 is turned on, a constant voltage is produced across the series circuit constituted by the transistors 88 and 89. The cathode of the photoresponsive sensing element or photodiode 9 is connected to the junction 99 and the anode thereof is connected to the amplifier 80, particularly, to the junction 100 between a constant current generator 90 and a transistor 92. The junction 100 is also connected to the base of a transistor 91. The emitter of the transistor 91 is connected through a parallel connection of constant current generator 93 and capacitor 94 to the lead wire 98 and also to the base of the transistor 92. The collector of the transistor 91 is connected to the collector of a transistor 95 which has an emitter connected to the lead wire 97. The base and collector of the transistor 95 are connected to the emitter and base of a transistor 96, respectively.

The above described circuit including the transistors 91, 92, 95 and 96, constant current generator 93 and capacitor 94 constitutes a current generator for generating a current proportional to the light received by the photodiode 9. The generation of such current will now be described. When the light received by the photodiode 9 has a constant brightness, a subtle current relative to the brightness is generated from the photodiode 9 and is applied to the junction 100. This subtle current is applied in part to the base of the transistor 91 and in part to the collector of the transistor 92. When the photodiode 9 receives no light, no subtle current is generated from the photodiode. In this case, a current from the constant current generator 90, referred to as a dummy current, substitutes the subtle current. The current generator 90 generates a current which is slightly higher than the current required for the base current of the transistor 91 which is approximately equal to $1/h_{FE}$ times the current IC3 generated from the constant current generator 93, wherein $h_{FE}$ is an amplification factor of the transistor 91. Therefore, when the constant current is applied to the junction 100 from the photodiode 9 and/or a constant current generator 90, a part of current is applied to the base of the transistor 91 for generating a collector-emitter current which is basically equal to a constant current generated by the constant current generator 93 and, at the same time, the remaining current is applied to the transistor 92 as a collector current. Here, the transistor 92 is biased by an appropriate voltage to allow the remaining current to flow through the collector of the transistor 92.

A capacitor 94 is connected between the base and emitter of the transistor 92 so that the emitter-base voltage of the transistor 92 is maintained at a constant value regardless of the fluctuating signal having a considerably high frequency applied to the junction 100, by the rectification effect of the capacitor 94. In other words, the transistor 92 absorbs the dc current component of the current applied to the junction 100. In this aspect, the transistor 92 functions as a current sink. When the light received by the photodiode 9 has a fluctuating brightness, the base current of the transistor 91 fluctuates correspondingly with the fluctuation of brightness relative to the constant base current $IC3/h_{FE}$ mentioned above. In the event that the photodiode 9 suddenly receives a pulsating light such as a reflected beam light, the photodiode 9 generates a corresponding current pulse which is applied to the base of the transistor 91. The current pulse is amplified and reproduced as a collector current of the transistor 91.

The rest of the circuit contained in the amplifier 80 constitutes a current-voltage converter for converting the fluctuating signal and/or pulse signal to a voltage signal. The converter includes a transistor 102 which has a base connected to the base of the transistor 95. The collector of the transistor is connected to the power line 97. Since the transistors 95 and 102 are made to have the same characteristics, the transistor 102 generates a collector current which is exactly the same as the collector current of the transistor 95. Connected to the collector of the transistor 102 is a first load including a transistor 103 and second load including series-connected transistors 104, 105 and 106. In transistors 104, 105 and 106, the base and collectors thereof are respectively connected together so that each transistor operates in a manner similar to a diode.

Transistors 107, 108, 109, 110 111, 112 and 113 and a constant current generator 114 constitutes an operational amplifier OP1. One input of the amplifier OP1, that is, the base of the transistor 107, and an output of the amplifier OP1, that is, the collector of the transistor 111, are connected together through a negative feedback circuit constituted by transistors 112, 113 and 103. A capacitor 115 is connected between the base of the transistor 112 and the lead wire 98. This capacitor 115 maintains the base voltage of the transistor 112 at a constant voltage regardless of abrupt changes in the collector current of the transistor 111. In other words, the negative feedback circuit of the operational amplifier OP1 has a time delay characteristic. Another input of the operational amplifier OP1, that is, the base of the transistor 108, is connected to an output 121 of a constant voltage generator constituted by a constant current generator 116, resistor 117, and series-connected transistors 118 and 119. The constant voltage Vc2 produced between the output 121 and the lead wire 98 is equal to the sum $2 V_{BE}$ of the base-emitter voltages of the transistors 118 and 119 wherein $V_{BE}$ is the base-emitter voltage of each of the transistors 118 and 119. A junction 122 between the constant current generator 116 and the resistor 117 produces a constant voltage $V_T$ which is higher than the voltage, produced from the output 121, by the amount of voltage drop across the resistor 117. The voltage $V_T$ is used as a reference voltage for comparators 161, 162, 163 and 164. The output signal at the amplifier 80 is generated from the junction 120 between the transistors 102 and 103 and is applied to the non-inverting input of the comparator 161. In a similar manner, the output of the amplifiers 81, 82 and 83 are connected to thenon-inverting inputs of the comparators 162, 163 and 164, respectively. The operation of the converter will now be described.

When the photodiode 9 is receiving a light having a constant brightness, the collector current of the transistor 95 will be a constant current which is equal to the current generated from the current generator 93. Therefore, the transistor 102 generates a constant collector current which is equal to the collector current of the transistor 95. The collector current of the transistors 95 and 102 will not be the same if they have different characteristics. When the collector current of the transistor 102 is constant, the voltage level at one input of the operational amplifier OP1, that is, at the junction 120, is balanced with the voltage $2 V_{BE}$ produced at the other input of the operational amplifier OP1, that is, at the junction 121, by the effect of negative feedback. In other words, the voltage 2 $V_{BE}$ across the series-connected transistors 118 and 119 is applied to the series-connected transistors 104, 105, and 106. In this case, almost all the collector current of the transistor 102 is used as a collector current of the transistor 103 by the reason described hereinbelow.

Since the voltage 2 $V_{BE}$ is applied across the transistors 104, 105 and 106, each of the transistors 104, 105 and 106 is supplied with voltage $\frac{2}{3} V_{BE}$. When $V_{BE}=540$ mV, each of the transistors 104, 105 and 106 would be supplied with a voltage 360 mV which is 180 mV smaller than the voltage $V_{BE}$. Because of the logarithmic characteristics of the transistor, the 180 mV change in the base-emitter voltage results in about a 1000 fold difference in the collector current. Therefore, when the collector current of the transistor 102 is constant and equal to the current flowing through the transistors 118 and 119, the current flowing through the series-connected transistors 104, 105 and 106 is about 1/1000 of the current flowing through the transistors 118 and 119. For example, when the current flowing through the transistors 118 and 119 is 4 μA, the current flowing through the transistors 104, 105 and 106 would be about 4 nA. Therefore, when the collector current of the transistor 102 is about 4 μA, most of the collector current flows to the transistor 103.

On the other hand, when the photodiode is receiving a light having a fluctuating brightness, the converter operates in the following manner.

The base of the transistor 103 is biased by the output of the operational amplifier OP1 through the delay circuit containing the capacitor 115. The voltage charge across the capacitor 115 can not instantaneously follow the voltage change at the junction 120 caused by the abrupt change in the collector current of the transistor 102. Therefore, the biasing voltage applied at the base of the transistor 103 is maintained constant. As a consequence, the transistor 103 serves as a high resistance element with respect to the current toward the collector thereof when the current is radically increasing, and as a low resistance element when the current is radically decreasing. Thus, the increment of the collector current of the transistor 102 is applied to the second load constituted by the transistors 104, 105 and 106 so that the voltage which is logarithmically compressed value of the applied current can be produced across the second load. The pulse signal obtained from any one of the photodiodes 9, 10, 11 and 12 as a result of receipt of the reflected light beam may vary from the minimum possible value, which is sufficient for the discrimination over the fluctuating signal, to the maximum possible value which is about several 1000 times the minimum possible value. Such a variation in amplitude of the pulse signal is in relation to the distance to the object and also to the reflectivity of the object. In order to cope with such a variation in amplitude, the collector current of the transistor 102 varies accordingly in the order of several 1000 times. In other words, the collector current of transistor 102 commensurate with the received light intensity is applied to the second load and logarithmically compressed as a voltage across the second load. Therefore, the signal which varies on the order of several 1000 times will not saturate by the limitation of the voltage source. Thus, an analog voltage signal indicative of the light intensity of the received light beam can be produced. If, a fixed resistance element were to be employed for the second load, a pulse signal of the received light beam which has a higher intensity than a predetermined intensity would be saturated to produce the same level of pulse signal which would be equal to the voltage source.

Since, according to the present invention, the pulse signal is in relation to the intensity of the received light beam, it is advantageous, when three photodiodes 9, 10 and 11 receive reflected light beam, to discriminate which one of the photodiodes has the highest intensity of the received light beam.

When the collector current of the transistor 102 decreases, the voltage appearing at the junction decreases. As described above, when the collector current of the transistor 102 includes an ac current component, a voltage corresponding to the ac current is produced from the junction 120.

Likewise, the amplifiers 81, 82, 83 and 15 have the same structure and characteristics as the amplifier 80 described above.

Now, the detecting circuit 16 in this embodiment is described.

The detecting circuit 16 includes an operational amplifier OP1 containing transistors 130 to 136 and a constant current generator 137. One input of the operational amplifier OP2, that is, the base 129 of the transistor 130, receives the output signal from the amplifier 15 which has the same circuit as the amplifier 80. The other input of the operational amplifier OP2, that is, the base 143 of the transistor 131, receives a charged voltage of a capacitor 141 which is charged by the current obtained from a constant current generator 140. A transistor 139 is connected in parallel with the capacitor 141. The conductivity of the transistor 139 is controlled by the output signal from the operational amplifier OP2.

The operational amplifier OP2 as described above operates in such a manner that the transistors 131, 135 and 136 are turned to a non-conductive state when the voltage applied to one input 129 is higher than the voltage applied the other input 143. Under such a condition, since the transistor 139 does not receive a forward biasing voltage from the transistor 138, the transistor 139 is turned to a non-conductive state and, thus, the capacitor 141 is charged by a constant current obtained from the constant current generator 140. On the other hand, when the voltage applied to the input 143 is higher than the voltage applied to the input 129, the transistors 131, 135 and 136 are turned to a conductive state.

Figure 7:
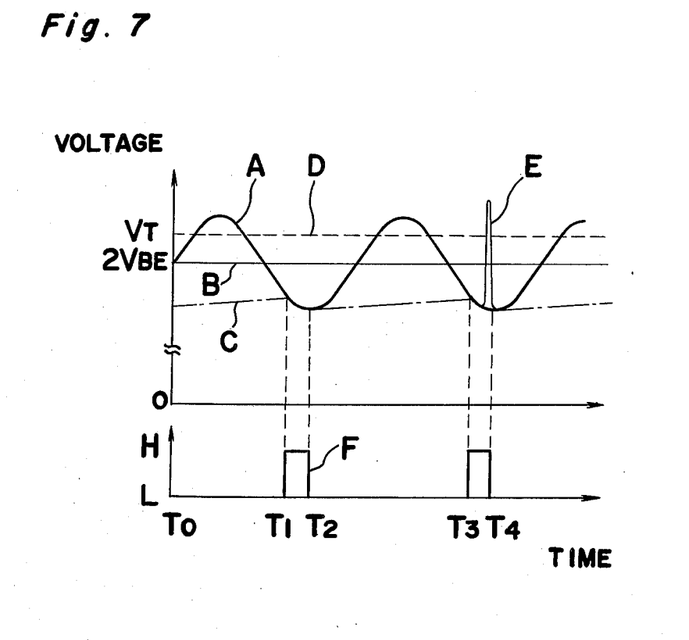
FIG. 7 is a graph showing waveforms of signals obtained at major points in the circuit of FIG. 6.

The operation of the detecting circuit 16 is now described with reference to the waveforms shown in FIG. 7. Upon receipt of the fluctuating light, the photodiode 14 generates a fluctuating signal which is amplified in the amplifier 15. The signal obtained from the amplifier 15 as shown by a waveform A in FIG. 7 is applied to the input of the detecting circuit 16, that is, to the base of the transistor 130. An average level of the waveform A is shown by a line B which is equal to the output voltage 2 $V_{BE}$ from the junction 121. A waveform shown by the chain line C represents a charged voltage across the capacitor 141. During the time interval from $T_0$ to $T_1$ shown in FIG. 7, the voltage (waveform A) applied to the base of the transistor 130 is higher than the voltage (waveform C) across the capacitor 141 so that the transistor 139 can be held in a non-conductive state to keep on charging the capacitor 141. Therefore, the voltage across the capacitor 141 gradually increases. Furthermore, during this time interval, the transistor 136 is held in a non-conductive state so that the collector thereof can be maintained at a low level. At the moment $T_1$, the voltage at the base of the transistor 130 matches the voltage at the base of the transistor 131 so that the transistor 131 can be turned to a conductive state and, thus, the transistor 139 is also turned to a conductive state. Therefore, the capacitor 141 starts to discharge. The discharge of the capacitor 141 is carried out in such a manner that the voltage across the capacitor 141 follows the voltage of the curve A until the moment $T_2$, that is, when the curve A reaches the minimum point. If there were no capacitor 141, the voltage level at the junction 143 would be equal to the curve A through the entire period.

During the period $T_1$ to $T_2$ wherein the base voltages of the transistors 130 and 131 are the same, the transistor 136 conducts to produce a high level signal from the collector thereof, that is, from the junction 144. Accordingly, a timing pulse F as shown in FIG. 7 is produced from the junction 144. Similar operations are repeated after the period $T_2$.

The time interval $T_1$ to $T_2$, that is, the pulse duration of the pulse P can be varied by changing the charging current of the capacitor 141. For example, when the charging current of the capacitor 141 is increased, the step-up moment of the pulse P can be shifted to a phase leading from the moment $T_1$ so that, in this case, the pulse duration becomes longer.

In addition, the pulse duration between $T_1$ and $T_2$ will also vary in response to the change in amplitude of the wave A in FIG. 7 even if the charging current for capacitor 141 is constant. In other words, the pulse appears at the approximate valley point of wave A with a narrowing duration time if the amplitude of the wave A increases. On the contrary, the pulse appears over a range from a phase of wave A leading the valley point to a phase corresponding to the valley point with a widening of the pulse duration if the amplitude decreases. As described later, wave A is no more harmful if the peak point of wave A is below the level $V_T$. There is no need to provide any period to inhibit the projection of the light beam in this case. Thus, the charging current is determined so that the projection of light beam is inhibited in a phase region of wave A in which wave A exceeds the level $V_T$, and is allowed except in the phase region.

A thorough operation of the circuit shown in FIG. 6 is described.

First of all, the power switch 174 is turned on for supplying electric power to the circuits 80, 81, 82, 83, 15 and 16 in readiness for the distance measurement. When carrying out the distance measurement, the operator aims at the object through a viewfinder (not shown) for directing the optical axis of the light emitting diode 1 to the object and, thereafter, pushes down a double acting button 173. The first depression of the button 173 turns on a switch 175 for supplying electric power to the remaining circuits 71, 72 and 73. The turning-on of the switch 175 also turns on a one-shot multi-vibrator 176 for producing a pulse having a predetermined pulse duration. The one-shot pulse from the vibrator 176 is applied to reset terminals of R-S flip-flop circuits 169, 170, 171 and 172 for resetting each of the flip-flop circuits to produce a low level signal. Thereafter, upon further depression of the button 173, the switch 18 is turned on. It is to be noted that the switch 18 may be replaced by a switching transistor which is turned on by the one-shot pulse from the vibrator 176. In this case, the button 173 can be a single acting button.

In the case where the ambient light and reflected light from the object do not contain any fluctuating light, that is, when the object is illuminated by daylight, the base voltage of the transistor 130 is the same as that of the transistor 131 so that the output 144 of the detecting circuit 16 can continually produce a high level signal from the very beginning. With this high level signal, a one-shot multivibrator 147 connected through the AND element to the output 144 is so actuated as to produce a one-shot pulse having a predetermined pulse duration. Thereupon, AND elements 165, 166, 167 and 168 are enabled to pass a high level signal therethrough and, at the same time, a transistor 150 of the pulse generator 20 conducts to allow a capacitor 152 to discharge through the light emitting diode 1 which then produces a light beam towards the object. The radiated light beam spots on a small region of the object and reflects back to the distance measuring device falling on one of the photodiodes 9, 10, 11 or 12. In some cases, the reflected light beam may fall on the neighboring two photodiodes or in other case where the object is located considerably far away from the distance measuring device, the light beam may not fall on any one of the photodiodes. For example, when the reflected light beams falls on the photodiode 9, a pulse signal corresponding to the light beam is produced from the junction 120 and is applied to the non-inverting input of the comparator 161. When the applied pulse signal exceeds a trigger level $V_T$ as defined by the signal applied to the inverting input of the comparator 161, the comparator 161 generates a high level signal which is applied through the AND element 165 to the flip-flop circuit 169. During this time, the other comparators 162, 163 and 164 produces low level signal. Thereupon, the flip-flop circuit 169 is set for producing a high level signal therefrom while the other flip-flop circuits 170, 171 and 172 are maintained reset. The combination of signals from the flip-flop circuits 169, 170, 171 and 172, that is, the signal combination of high, low, low, low, is applied to the logic circuit 71. The signal combination is maintained even after the pulse duration of the pulse from the one-shot multivibrator 147 is over. In the logic circuit 71, the signal combination is processed in the known manner to discriminate the distance. The discriminated distance signal is used for automatically focusing the objective lens assembly (not shown) by the lens control means 72 and also for automatically displaying the detected and discriminated distance to the object.

In the case where the ambient light and reflected light from the object contains fluctuating light, that is, when the object is illuminated by the lamp light, the signal applied to the input of the detecting circuit 16 fluctuates as shown by the waveform A in FIG. 7. When the switch 18 is closed during the time interval or the range of phase defined between the moments $T_2$ and $T_3$, the timing pulse will be generated from the output 144 when the fluctuating signal reaches about the minimum or valley point of the fluctuating signal, that is, during the time interval $T_3$ to $T_4$. During this time interval $T_3$ to $T_4$, the produced timing pulse actuates the pulse generator 20 to generate the light beam and actuates the control circuit 13 to detect the reflected light beam and temporarily store the detected signal. The pulse signal corresponding to the detected light beam is a narrow pulse signal having a waveform E as shown in FIG. 7. Although the peak of the fluctuating signal exceeds the triggering level $V_T$, the available signal passing through the AND elements 165 to 168 is obtained only when the one-shot pulse is produced from the one-shot multivibrator 147 upon receipt of the timing pulse, that is, during the time interval $T_3$ to $T_4$. During this time interval $T_3$ to $T_4$, the fluctuating signal may not exceed the triggering level $V_T$. The signal exceeding the triggering level $V_T$ during this time interval is the signal corresponding to the detected light beam. Therefore, the fluctuating signal does not interfere with the detection of the reflected light beam.

It should be noted that the region of phase of curve A defined between $T_2$ and $T_3$ in FIG. 7 is for inhibiting the projection of light beam. Therefore, detecting circuit 16 is considered to be a circuit means for generating a timing signal to inhibit the projection of light beam as well as a circuit means for generating a timing signal to allow the same.

In the embodiment shown in FIG. 6, the signal corresponding to the ambient light, that is, the signal applied to the input 129 of the detecting circuit 16, can be obtained from any one of the amplifiers 80, 81, 82 or 83. In this case, it is not necessary to provide the conversion circuit constituted by the photodiode 14 and the amplifier 15.

Although the present invention has been fully described by way of examples with reference to the accompanying drawings, it is to be noted that various changes and modifications are apparent to those skilled in the art. Therefore, unless such changes and modifications depart from the true scope of the present invention, they should be construed as included therein.

What is claimed is:

1. A distance measuring device comprising, in combination:

means for projecting a pulsed light beam;

means for receiving the light beam reflected from an object to be measured, said light beam receiving means obtaining information of the zonal distance between the distance measuring device and the object to be measured by utilizing the difference in the incident angle of the reflected light beam;

means for receiving ambient light and for generating a signal indicative of the change in brightness of the ambient light;

means connected to the ambient light receiving means for detecting the moment when the rate of change in brightness of the ambient light is relatively slow, and for generating a timing signal in dependence thereon, said detecting means operatively connected to the light beam projecting means for allowing the projecting means to project the light beam simultaneous with the reception of the timing signal.

2. A distance measuring device as claimed in claim 1, wherein said light beam receiving means comprises a plurality of photoresponsive sensing elements which are arranged in a row in a direction approximately perpendicular to the direction of projection of the light beam.

3. A distance measuring device as claimed in claim 2, wherein said ambient light receiving means is at least one of said plurality of photoresponsive sensing elements.

4. A distance measuring device as claimed in claim 1, wherein said detecting means, when said ambient light has a periodically fluctuating brightness, detects the moment when said fluctuating brightness is approximately at the peak point thereof.

5. A distance measuring device as claimed in claim 1, wherein said detecting means, when said ambient light has a periodically fluctuating brightness, detects the moment when said fluctuating brightness is approximately at the valley point thereof.

6. A distance measuring device comprising, in combination:

means for projecting a pulsed light beam;

means for receiving light reflected from an object located in the path of said light beam, said receiving means including means for detecting the arrival of said light beam reflected from said object;

means for determining a zonal distance of the object in response to said receiving means;

means for receiving ambient light and means connected to said means for receiving ambient light and responsive to intensity changes in the ambient light for producing a signal corresponding to substantially cyclical alternating changes in the intensity of the ambient light; and means connected to said producing means and responsive to the signal of said producing means for generating a timing signal having a predetermined relationship with respect to a specific phase of each cycle of the alternating changes in the intensity of the ambient light; and further comprising means for controlling said projecting means to project the light beam under the control of said timing signal.

7. A distance measuring device comprising, in combination:

means for projecting a pulsed light beam;

means for receiving light reflected from an object located in the path of said light beam, said receiving means including means for detecting the arrival of said light beam reflected from said object;

means for determining a zonal distance of the object in response to said receiving means;

means for receiving ambient light and means connected to said means for receiving ambient light and responsive to intensity changes in the ambient light for producing a signal corresponding to substantially cyclical alternating changes in the intensity of the ambient light; and means connected to said producing means and responsive to the signal of said producing means for generating a timing signal having a predetermined relationship with respect to a specific phase of each cycle of the alternating changes in the intensity of the ambient light; and further comprising means for instructing the intitiation of distance measurment and means for actuating said projecting means to project the light beam when said instructing means instructs the initiation of distance measurement and said generating means generates the timing signal.

8. A distance measuring device comprising, in combination:

means for projecting a pulsed light beam;

means for receiving light reflected from an object located in the path of said light beam, said receiving means including means for detecting the arrival of said light beam reflected from said object;

means for determining a zonal distance of the object in response to said receiving means;

means for receiving ambient light and means connected to said means for receiving ambient light and responsive to intensity changes in the ambient light for producing a signal corresponding to substantially cyclical alternating changes in the intensity of the ambient light; and means connected to said producing means and responsive to the signal of said producing means for generating a timing signal having a predetermined relationship with respect to a specific phase of each cycle of the alternating changes in the intensity of the ambient light; and further comprising means for actuating said projecting means to project the light beam and means for interrupting said projecting means from projecting the light beam during a period of time under the control of said timing signal, whereby said projecting means projects the beam light except in said period of time upon actuation by said actuating means.

9. A distance measuring device as claimed in claim 8, further comprising means for releasing the projecting means from the interruption by said interrupting means when the ambient light is substantially unchanged, whereby said projecting means projects the beam light at any time upon actuation by said actuating means if the ambient light is substantially unchanged in intensity.

10. A distance measuring device comprising, in combination:

means for projecting a pulsed light beam;

means for receiving light reflected from an object located in the path of said light beam, said receiving means including means for detecting the arrival of said light beam reflected from said object;

means for determining a zonal distance of the object in response to said receiving means;

means for receiving ambient light and means connected to said means for receiving ambient light and responsive to intensity changes in the ambient light for producing a signal corresponding to substantially cyclical alternating changes in the intensity of the ambient light; and means connected to said producing means and responsive to the signal of said producing means for generating a timing signal having a predetermined relationship with respect to a specific phase of each cycle of the alternating changes in the intensity of the ambient light;

means for controlling said projecting means in response to said timing signal; and further comprising means for making said determining means operative under the control of said timing signal.

11. A distance measuring device as claimed in claim 10, wherein said determining means includes means for storing the output of said detecting means and said making means allows the storage operation of said storing means under the control of said timing signal.

12. A distance measuring device as claimed in claims 6 or 7 or 8 or 10, wherein said generating means generates said timing signal when the phase of the alternating change in the intensity of the ambient light is about the peak point of the change thereof.

13. A distance measuring device as claimed in claims 6 or 7 or 8 or 10, wherein said generating means generates said timing signal when the phase of the alternating change in the intensity of the ambient light is about the valley point of the change thereof.

14. A distance measuring device as claimed in claims 6 or 7 or 8 or 10, wherein said generating means includes: an operational amplifier having a first and second inputs and an output, said first input being connected to said producing means; a capacitor; means for providing said capacitor with a constant current; said second input of said operation amplifier being responsive to the voltage on said capacitor; and means for discharging said capacitor, said discharging means being controlled by said output of said operational amplifier.

15. A distance measuring device as claimed in claims 6 or 7 or 8 or 10, wherein said receiving means includes a plurality of photosensitive elements corresponding to different ranges of distances from said projecting means so that each photosensitive element respectively detect the arrival of the reflected light with respect to an object located in its corresponding range.

16. A distance measuring device as claimed in claim 15, wherein said producing means is responsive to at least one of said photosensitive elements to produce said signal following the alternating change in the intensity of the ambient light.

* * * * *